US006518961B2

(12) United States Patent
Sung

(10) Patent No.: US 6,518,961 B2
(45) Date of Patent: Feb. 11, 2003

(54) ADAPTER DEVICE FOR SEPARATING SYNCHRONIZING SIGNAL FROM SYNC-ON-GREEN VIDEO SIGNAL AND COLOR DISPLAY APPARATUS WITH THE SAME

(76) Inventor: Jun-Ho Sung, 159-225, Sangdo 1-dong, Dongjak-ku, Seoul (KR)

( * ) Notice: Subject to any disclaimer, the term of this patent is extended or adjusted under 35 U.S.C. 154(b) by 180 days.

(21) Appl. No.: 09/767,023

(22) Filed: Jan. 23, 2001

(65) Prior Publication Data

US 2001/0022580 A1 Sep. 20, 2001

(30) Foreign Application Priority Data

Jan. 25, 2000 (KR) ........................................... 00-3469

(51) Int. Cl.[7] ................................................ H04N 5/04

(52) U.S. Cl. ....................................... 345/204; 348/502

(58) Field of Search ................................ 348/496, 502, 348/520, 517, 642, 599, 530, 500; 345/509, 699, 3, 4, 698

(56) References Cited

U.S. PATENT DOCUMENTS 5,229,853 A * 7/1993 Myers ........................ 348/443
5,767,820 A * 6/1998 Bassett et al. ................. 345/8
5,805,150 A * 9/1998 Nishino et al. ............. 345/213
5,949,491 A * 9/1999 Callahan et al. ............ 345/718
6,020,901 A * 2/2000 Lavelle et al. .............. 345/213
6,064,443 A * 5/2000 Lee ........................... 345/213
6,104,414 A * 8/2000 Odryna et al. ............... 345/1.3
6,268,889 B1 * 7/2001 Koori ......................... 348/460
6,348,931 B1 * 2/2002 Suga et al. .................. 345/3.3

OTHER PUBLICATIONS $RG_sB$ to VGA Adapter by Magenta Research, LTD (2).*
NTI Product Application Notes: HP9000 &NTI KVM Switch On Screen Display by NTI.*
RGB 105 Dedicated VGA & Mac Interface by Extron Electronics.*
13W3M to HD15F Sun or SGI Frame Buffer to Multi–Sync Monitor Adaptor.*
HD15 male to 5BNC male cable by MonitorWorld.*

* cited by examiner

*Primary Examiner*—Vijay Shankar
*Assistant Examiner*—Nitin Patel
(74) *Attorney, Agent, or Firm*—Robert E. Bushnell, Esq.

(57) ABSTRACT

An adapter device, which is connected between a host for outputting a sync-on-green (SOG) signal and a conventional display monitor, separates a sync signal from the SOG signal, and supplies red, blue, and SOG signals to a color display monitor together with the separated sync signal. The adapter device is composed of an adapter housing upon which three BNC connectors are mounted, and a D sub-connector which is connected to the housing through an adapter cable. A sync signal separating circuit is embedded in the housing, and a power of the circuit is supplied from the color display monitor through D sub-connector. Since the color display monitor need not have a special sync signal separating circuit for supporting an SOG signal mode, power consumption and manufacturing price can be reduced. And, a conventional color display monitor can be used in a color display apparatus of the SOG signal mode.

15 Claims, 2 Drawing Sheets

ADAPTER DEVICE FOR SEPARATING SYNCHRONIZING SIGNAL FROM SYNC-ON-GREEN VIDEO SIGNAL AND COLOR DISPLAY APPARATUS WITH THE SAME

CLAIM OF PRIORITY

This application makes reference to, incorporates the same herein, and claims all benefits accruing under 35 U.S.C §119 from an application entitled Adapter Device For Separating Synchronizing Signal From Sync-on-Green Video Signal And Color Display Apparatus With The Same earlier filed in the Korean Industrial Property Office on Jan. 25, 2000, and there duly assigned Serial No. 2000-03469 by that Office.

BACKGROUND OF THE INVENTION

1. Field of the Invention

The present invention relates to a color display apparatus and, more particularly, to an adapter device for separating a sync signal from a sync-on-green video signal and a color display apparatus including the adapter device.

2. Description of the Related Art

Generally, a computer system uses red (R), green (G), and blue (B) video signals and horizontal and vertical synchronizing signals to display images on a display monitor. Modes of synchronizing video signals in recent computer systems are classified into a separate horizontal/vertical sync mode, a composite sync mode, and a sync-on-green (SOG) mode. In the separate sync mode, horizontal and vertical sync signals are separately transmitted from each other. In the composite sync mode, horizontal and vertical sync signals are compounded into a composite signal and then the composite signal is transmitted. And, in the SOG mode, a composite sync signal and a green (G) video signal are compounded and transmitted. Almost all of the recently developed computer display monitors support either the separate sync mode or the composite sync mode, but the SOG mode is still utilized in a few fields because it is efficient to long-distance transmission of a video signal and a share system that is shared with many display monitors. As a transmission technique has been developed, transmission characteristics are considerably improved. However, as personal computers widely spread out, demand of the SOG signal mode is rapidly reduced.

Most high-priced LCD monitors and CRT monitors basically employ the separate sync signal mode and the composite sync signal mode, and support the SOG signal mode in order to widen an application range thereof. In order to support the SOG signal mode, a sync signal separating circuit for separating a sync signal from an SOG signal must be embedded in such a monitor. Accordingly, price and power consumption of a monitor supporting the SOG signal mode is higher than those of a monitor not supporting it. In a power-save mode, a power-consumption difference therebetween is about hundreds of milliwatt (mW).

A computer having the SOG signal mode must employ a display monitor that supports the SOG signal mode. Therefore, a user must purchase a high-priced display monitor that can support the SOG signal mode. U.S. Pat. No. 5,229,853 to Robert L. Myers entitled System For converting A Video Signal From A First Format To A Second Format and U.S. Pat. No. 5,805,150 to Hironari Nishino et al. entitled Synchronous Signal Separation Circuit each discuss the use of a sync signal separation circuit to separate the sync signal from the green video signal and are incorporated-by-reference herein.

I have determined that by using a suitable adapter that enables a display monitor of the separate and composite sync signal modes to be used in a display apparatus of the SOG signal mode, the foregoing problems can be solved. That is, since high-priced display monitors supporting the SOG signal mode need not embed a sync signal separation circuit therein, manufacturing cost and power consumption can be reduced. Moreover, display monitors that do not support the SOG signal mode can be used with the computer having the SOG signal mode.

U.S. Pat. No. 5,767,820 to Bruce E. Bassett et al. entitled Head-Mounted Visual Display describes a control box capable of receiving sync-on-green video signals or video signals having separate sync signals to provide a video signal to a monitor and/or a head-mounted display.

SUMMARY OF THE INVENTION

The present invention is contrived to solve the foregoing problems. Therefore, it is an object of the invention to provide an adapter device that separates a sync signal from an SOG signal, and inputs the separated sync signal to a display monitor together with a video signal.

To achieve the above object of the invention, there is provided an adapter device including a first connector for inputting a red signal, a blue signal, and a sync-on-green (SOG) signal; a sync signal separating circuit for separating a sync signal from the SOG signal; and a second connector for outputting the red signal, the blue signal, the SOG signal, and the separated sync signal.

The first connector is composed of a plurality of BNC (Bayonet Neill-Concelman) connectors for inputting the red signal, the blue signal, and the SOG signal, respectively. And the second connector is composed of a D sub-connector or a 13W3 connector. The adapter device further includes a power input terminal for receiving an operation power of the sync signal separating circuit. The sync signal separating circuit outputs either a composite sync signal or separated horizontal and vertical sync signals.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

An adapter device of this invention is connected between a host (computer) for outputting an SOG signal and a conventional (VGA: video graphics array) display monitor.

The adapter device separates a sync signal from the SOG signal that is supplied from the host.

Figure 1:
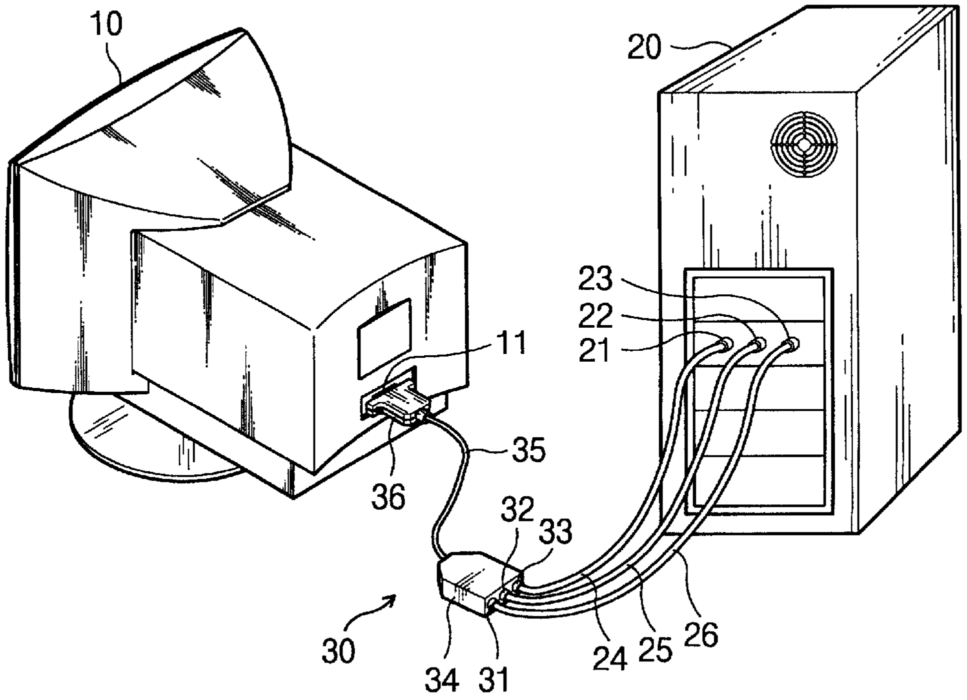
FIG. 1 is a perspective view showing a computer system employing an adapter system in accordance with the present invention.

As shown in FIG. 1, a color display monitor 10 and a host 20 are interconnected by an adapter device 30 (discussed im more detail below with respect to FIGS. 2, 3 and 4). The host 20, being a computer body, includes (but not shown) a central processing unit (CPU), a main memory device, a hard disk drive, various chipsets, a video card for outputting an SOG signal, and so on.

Host 20 outputs a red signal, a blue signal, and a sync-on-green signal (SOG signal) through Bayonet Neill-Concelman (BNC) connectors 21, 22, and 23, respectively. The color display monitor 10 is a conventional cathode ray tube (CRT) monitor or a liquid crystal display (LCD) monitor, and displays images by inputting a video signal of a composite sync signal mode or a separate sync signal mode.

Figure 2:
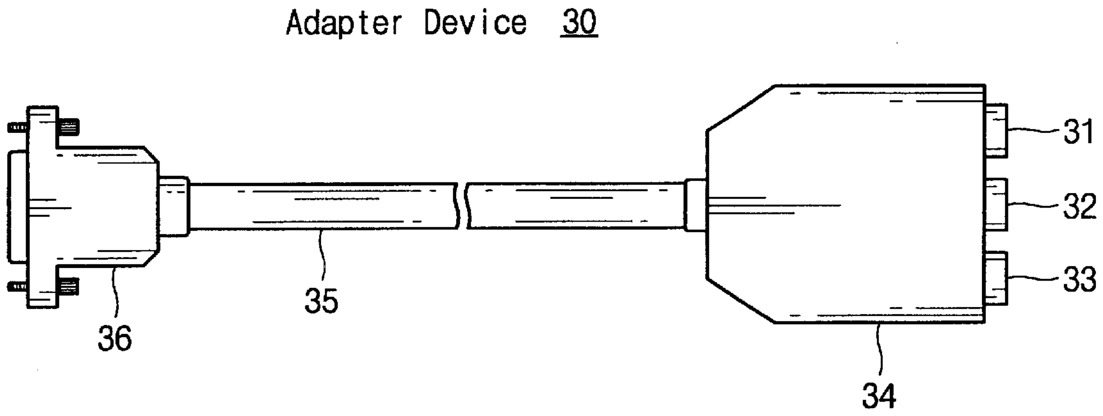
FIG. 2 is a perspective view showing an appearance of the adapter device shown in FIG. 1.

Referring now to FIG. 2, an adapter device 30 is composed of an adapter housing 34 in which a sync signal separating circuit (shown in FIGS. 3 and 4) is embedded, a D sub-connector 36, and an adapter connector 35 for connecting the adapter housing 34 to the D sub-connector 36. Three BNC connectors 31, 32, and 33 are mounted on one side of the adapter housing 34. And, the D sub-connector 36 may be composed of a HD15 connector or a 13W3 connector.

In FIG. 1, BNC connectors 31, 32, and 33 of the adapter device 30 are connected to BNC connectors 21, 22, and 23 of the host 20 through coaxial cable 24, 25, and 26, respectively. A D sub-connector 36 of the adapter device 30 is connected to a D sub-connector 11 of the display monitor 10. The adapter device 30 inputs the red, blue, and SOG signals output from the host 20. The adapter device 30 separates a sync signal from the SOG signal, and inputs the red, blue, green, and separated sync signals to the color display monitor 10.

Figure 3:
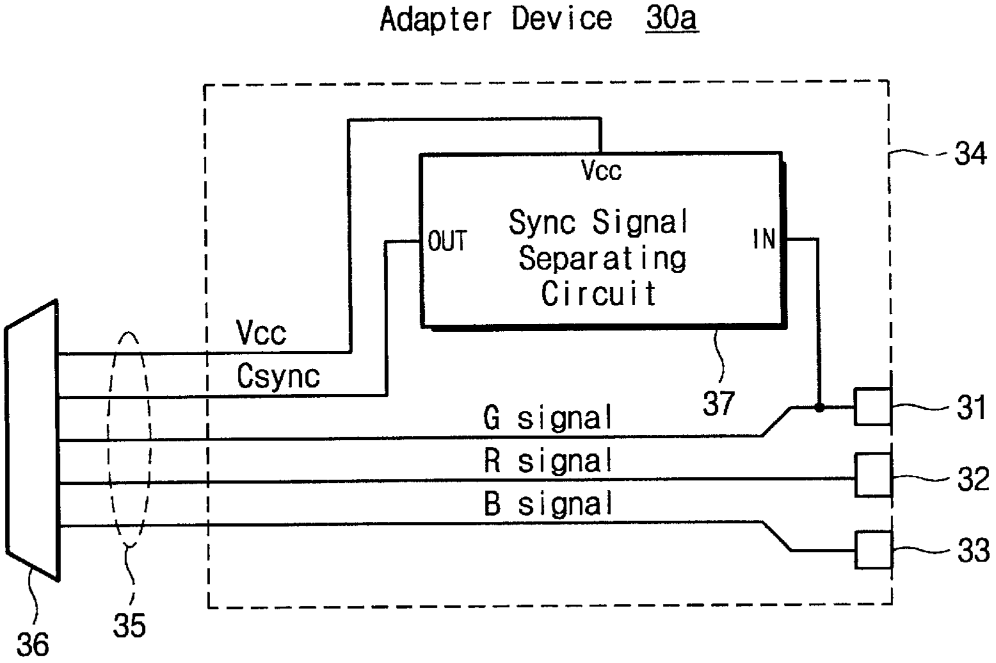
FIG. 3 is a circuit diagram of an adapter device for outputting a separated composite sync signal in accordance with one embodiment of the present invention.

Referring now to FIG. 3, an adapter device 30*a,* according to one embodiment of the present invention, has a sync signal separating circuit 37 for separating a composite sync signal Csync. BNC connectors 31, 32, and 33 mounted on one side of adapter housing 34 are connected to a D sub-connector 36 through an adapter cable 35. The BNC connector 31, through which the SOG signal is input, is coupled to an input terminal IN of the sync signal separating circuit 37, which is embedded in the adapter housing 34. The sync signal separating circuit 37 inputs the SOG signal that is supplied from a host, and separates the composite sync signal Csync from the SOG signal. An operation power Vcc of the sync signal separating circuit 37 is supplied from a color display monitor 10 through the D sub-connector 36. The adapter device 30*a* may be used in a color display monitor that inputs a composite sync signal.

Figure 4:
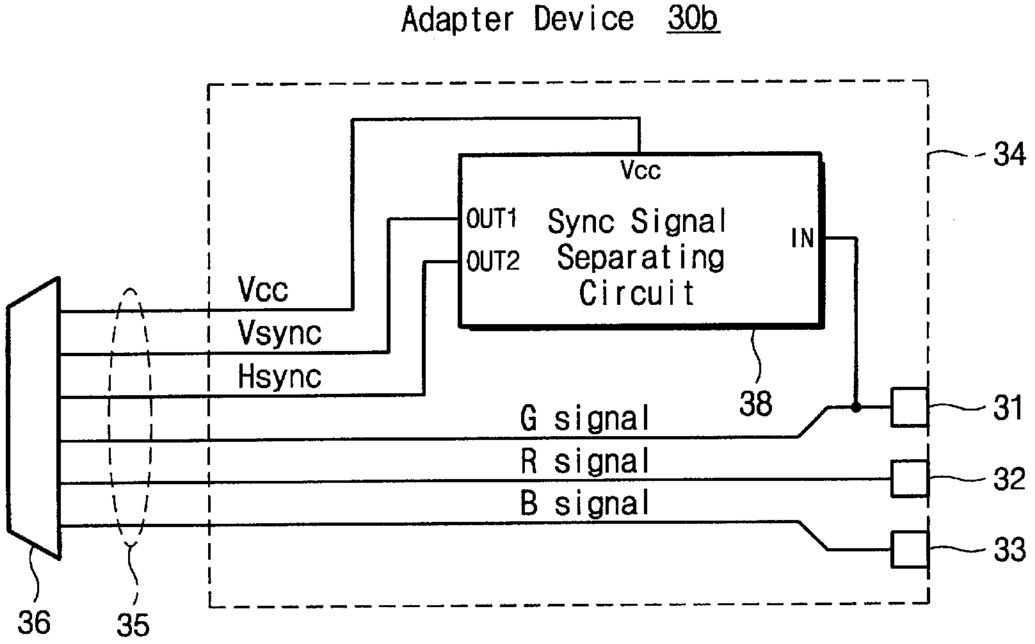
FIG. 4 is a circuit diagram of an adapter device for outputting separated horizontal and vertical sync signals in accordance with another embodiment of the present invention.

Referring now to FIG. 4, an adapter device 30*b,* according to another embodiment of the present invention, has a sync signal separating circuit 38 that separates the sync signal from the SOG signal and output separate horizontal and vertical sync signals Hsync and Vsync. BNC connector 31, 32, and 33 mounted on one side of an adapter housing 34 are connected to a D sub-connector 36 through an adapter cable 35. The BNC connector 31 to which the SOG signal is input is coupled to an input terminal IN of the sync signal separating circuit 38. The sync signal separating circuit 38, which is embedded in an adapter housing 34, inputs the SOG signal supplied from a host, and separates the sync signal from the SOG signal and output separate horizontal and vertical sync signals Hsync and Vsync. An operation power Vcc of the sync signal separating circuit 38 is supplied from a color display monitor 10 through the D sub-connector 36. The adapter device 30*b* may be used with a color display monitor that inputs a separated horizontal and vertical sync signals.

As described, a color display monitor, according to the present invention, need not have a sync signal separating circuit for supporting an SOG signal mode from a host computer, thus power consumption and manufacturing price can be reduced. And, it is possible to simplify a software program that requires a complex structure for processing a separating sync signal, a composite sync signal, and an SOG signal in a color display monitor. Using an adapter device of this invention, a conventional color display monitor can be used with a host having the SOG signal mode.

What is claimed is:

1. An adapter device externally connected between a host and a monitor, said adapter device including:

a first connector for inputting a red video signal, a blue video signal, and a sync-on-green video signal from said host;

a sync signal separating circuit for separating a sync signal from the sync-on-green video signal; and a second connector for outputting the red video signal, the blue video signal, the sync-on-green video signal, and the separated sync signal to said monitor, said second connector having an input for supplying a predetermined voltage from said monitor to said sync signal separating circuit.

2. The adapter device as set forth in claim 1, wherein the first connector is composed of a plurality of BNC connectors for inputting the red video signal, the blue video signal, and the sync-on-green video signal, respectively; and wherein the second connector is composed of a D sub-connector.

3. The adapter device as set forth in claim 1, wherein the second connector is composed of a HD15 connector or a 13W3 connector.

4. The adapter device as set forth in claim 2, wherein the D-sub connector is composed of a HD15 connector or a 13W3 connector.

5. The adapter device as set forth in claim 1, wherein the sync signal separating circuit outputs either a composite sync signal or separated horizontal and vertical sync signals.

6. An adapter device externally connected between a host and a monitor, said adapter device including:

a first connector for inputting a red video signal, a blue video signal, and a sync-on-green video signal output from said host;

an adapter housing upon which the first connector is mounted, and in which a sync signal separating circuit for separating a sync signal from the sync-on-green video signal is embedded;

a second connector for outputting the red video signal, the blue video signal, the sync-on-green video signal, and the separated sync signal for input to said monitor; and a connector cable for electrically connecting the first connector and the sync signal separating circuit to the second connector, wherein a predetermined voltage output from said monitor is input to said sync signal separating circuit via said second connector and said connector cable.

7. The adapter device as set forth in claim 6, wherein the first connector is composed of a plurality of BNC connectors for inputting the red video signal, the blue video signal, and the sync-on-green video signal, respectively; and wherein the second connector is composed of a D sub-connector.

8. The adapter device as set forth in claim 6, wherein the second connector is composed of a HD15 connector or a 13W3 connector.

9. The adapter device as set forth in claim 7, wherein the D-sub connector is composed of a HD15 connector or a 13W3 connector.

10. The adapter device as set forth in claim 6, wherein the sync signal separating circuit outputs either a composite sync signal or separated horizontal and vertical sync signals.

11. A color display apparatus comprising:

a host for outputting a red video signal, a blue video signal, and a sync-on-green video signal;

an adapter device including a first connector for inputting the red video signal, the blue video signal, and the sync-on-green video signal from the host, a sync signal separating circuit for separating a sync signal from the sync-on-green video signal, and a second connector for outputting the red video signal, the blue video signal, the sync-on-green video signal, and the separated sync signal; and a color display monitor for displaying images by inputting the red video signal, the blue video signal, the sync-on-green video signal, and the separated sync signal through the second connector, and for supplying a predetermined voltage to said sync signal separating circuit of the adapter device through the second connector.

12. The color display apparatus as set forth in claim 11, wherein the first connector is composed of a plurality of BNC connectors for inputting the red video signal, the blue video signal, and the sync-on-green video signal, respectively; and wherein the second connector is composed of a D sub-connector.

13. The color display apparatus as set forth in claim 11, wherein the second connector is composed of a HD15 connector or a 13W3 connector.

14. The color display apparatus as set forth in claim 12, wherein the D-sub connector is composed of a HD15 connector or a 13W3 connector.

15. The color display apparatus as set forth in claim 12, wherein the sync signal separating circuit outputs either a composite sync signal or separated horizontal and vertical sync signals.

* * * * *